United States Patent
Seller

(10) Patent No.: US 9,551,786 B2
(45) Date of Patent: Jan. 24, 2017

(54) RANGING AND POSITIONING SYSTEM

(71) Applicant: Olivier B. A. Seller, Saint Soulle (FR)

(72) Inventor: Olivier B. A. Seller, Saint Soulle (FR)

(73) Assignee: SEMTECH CORPORATION, Camarillo, CA (US)

(*) Notice: Subject to any disclaimer, the term of this patent is extended or adjusted under 35 U.S.C. 154(b) by 314 days.

(21) Appl. No.: 14/171,126

(22) Filed: Feb. 3, 2014

(65) Prior Publication Data

US 2014/0225762 A1    Aug. 14, 2014

(30) Foreign Application Priority Data

Feb. 14, 2013   (EP) ............................... 20130155220

(51) Int. Cl.

| | | |
|---|---|---|
| G01S 13/34 | (2006.01) | |
| G01S 13/84 | (2006.01) | |
| G01S 7/40 | (2006.01) | |
| G01S 13/74 | (2006.01) | |
| G01S 13/87 | (2006.01) | |
| G01S 7/00 | (2006.01) | |
| G01S 13/36 | (2006.01) | |
| G01S 13/75 | (2006.01) | |
| G01S 7/35 | (2006.01) | |

(52) U.S. Cl.
CPC .............. *G01S 13/343* (2013.01); *G01S 7/003* (2013.01); *G01S 7/40* (2013.01); *G01S 13/74* (2013.01); *G01S 13/84* (2013.01); *G01S 13/876* (2013.01); *G01S 13/36* (2013.01); *G01S 13/751* (2013.01); *G01S 2007/358* (2013.01)

(58) Field of Classification Search
CPC ................................ G01S 13/36; G01S 13/751
USPC .................... 342/47, 130–132; 234/130–132
See application file for complete search history.

(56) References Cited

U.S. PATENT DOCUMENTS

| | | |
|---|---|---|
| 5,550,549 A | 8/1996 | Procter, Jr. et al. |
| 6,940,893 B1 | 9/2005 | Pinkney et al. |
| 7,843,379 B2 | 11/2010 | Menzer et al. |
| | (Continued) | |

FOREIGN PATENT DOCUMENTS

| | | |
|---|---|---|
| DE | 10310157 A1 | 9/2004 |
| EP | 2278724 A1 | 1/2011 |
| | (Continued) | |

OTHER PUBLICATIONS

R. Pfeil et al., "Optimized Parameter Estimation for the LPM Local Positioning System," IEEE Transactions on Instrumentation and Measurement, vol. 62, No. 1, Jan. 2013. pp. 153-166.

*Primary Examiner* — Peter Bythrow
*Assistant Examiner* — Helena Seraydaryan
(74) *Attorney, Agent, or Firm* — Blank Rome LLP

(57) ABSTRACT

A ranging and positioning system comprising transmitters and receiver nodes communicating together by chirp-modulated radio signals, that have a ranging mode in which ranging exchange of signals takes place between a master device and a slave device that leads to the evaluation of the range between them. The slave is arranged for recognizing a ranging request and transmit back a ranging response containing chirps that precisely aligned in time and frequency with the chirps in the ranging requests, whereupon the master can receive the ranging response, analyze the time and frequency the chirps contained therein with respect to his own time reference, and estimate a range to the slave.

13 Claims, 5 Drawing Sheets

(56) References Cited

U.S. PATENT DOCUMENTS

| | | |
|---|---|---|
| 2006/0232463 A1 | 10/2006 | Burton et al. |
| 2011/0064119 A1* | 3/2011 | Sforza ................. H04B 1/69 |
| | | 375/139 |
| 2011/0273334 A1 | 11/2011 | Karr |
| 2012/0032855 A1* | 2/2012 | Reede ................. G01S 5/0289 |
| | | 342/458 |

FOREIGN PATENT DOCUMENTS

| | | |
|---|---|---|
| EP | 2449690 A1 | 5/2012 |
| WO | WO-2011000936 A1 | 1/2011 |

\* cited by examiner

RANGING AND POSITIONING SYSTEM

REFERENCE DATA

This application claims priority from European Patent application EP13155220.0 of Feb. 14, 2013, the contents whereof are hereby included by reference.

FIELD OF THE INVENTION

The present invention concerns, in embodiments, a method of transmitting information on a radio channel and, in particular, a wireless transmission scheme that can span long distances with a low power consumption, based on chirp spread spectrum. Embodiments of the inventions relate likewise to low-complexity transmitting and receiving devices suitable for wireless transmission according to the inventive transmission scheme.

DESCRIPTION OF RELATED ART

Digital wireless data transmission is used in a wide variety of systems that present a great variability in both in data rate, transmission range, and power consumption. There is however a need of a digital transmission scheme that allies a long transmission range with low power consumption, and can be realized with simple receivers and transmitters.

Many systems are known that provide information on the distance between the end points of a wireless communication link. One can cite, for example the GPS system and all similar localisation systems based on satellites that emit direct-modulated spread spectrum signals. Such systems have shown excellent ranging precision over long ranges, but are in general asymmetrical, and computationally intensive. Limitation of these techniques are however the comparatively high complexity of the receivers, the acquisition times that can be very long for weak signals, their power consumption, and the difficulty of operation in indoor environments.

UWB ranging systems are known, that can potentially offer high precision ranging measures and transmit data, but only over limited distances.

It is known to extract position information in WiFi systems. WiFi ranging, however, cannot provide accurate position information. WiFi positioning relies on listening to access points beacons, and using an access points maps/database. RSSI can be used in addition, but time of flight is not available. Also, like with GPS, the receiver gets a localization information, but not the network.

U.S. Pat. No. 6,940,893 describes a ranging system based on a double exchange between a master and a slave, that emit radio chirps. This technique uses fast impulsive chirps similarly to UWB systems and, due to the very large bandwidth, is hard to extend to long ranges. The range computation is based on a double exchange of ranging information, to compensate for the fact that the time reference in master and slave are not precisely synchronised. This requires considerable complexity in the transceivers. Also since range estimate are explicitly transmitted over the air, this technique is not intrinsically secure.

European patent application EP2449690 describes a communication system using digitally-synthesized chirp symbols as modulation, and a suitable FFT based receiver.

It is an aim of the present invention to propose a system that can estimate the range between the end points of a wireless link over longer distances, in a simpler and less energy-intensive manner than the systems known in the art.

BRIEF SUMMARY OF THE INVENTION

According to the invention, these aims are achieved by means of the object of the appended claims.

BRIEF DESCRIPTION OF THE DRAWINGS

The invention will be better understood with the aid of the description of embodiments given by way of example and illustrated by the figures, in which.

DETAILED DESCRIPTION OF POSSIBLE EMBODIMENTS OF THE INVENTION

Figure 1:
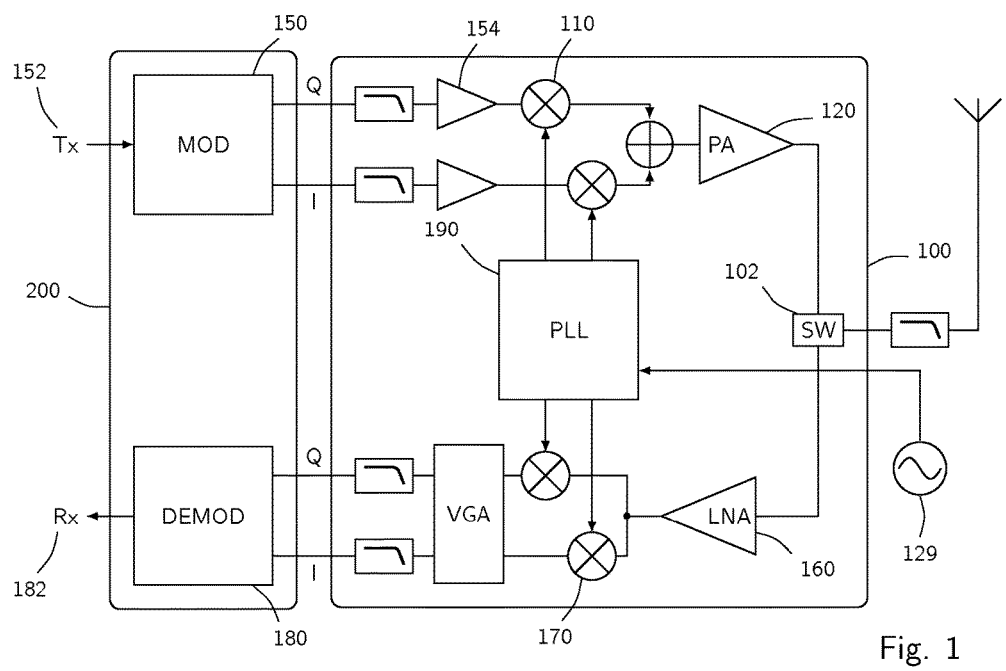
FIG. 1 shows, in schematic simplified fashion, the structure of a radio modem according to one aspect of the present invention.

Several aspects of the chirp modulation technique employed in the present invention are described in European Patent Application EP2449690, that is hereby incorporated by reference, and will be reminded here summarily. The radio transceiver that is schematically represented in FIG. 1 is a possible embodiment of the invention. The transceiver includes a baseband section 200 and a radiofrequency section 100. Concentrating on the transmitter part, the baseband modulator 150 generates, based on the digital data 152 that are present at its input, a baseband signal whose I and Q component are converted to the desired transmission frequency by the RF section 100 amplified by the power amplifier 120, and transmitted by the antenna.

The architecture presented allows several variants and modifications, without departing from the frame of the invention, and is provided as non-limiting example. In a possible embodiment, polar components, amplitude A, and phase $\phi$, rather than the Cartesian component I and Q could be synthesized.

The conversion of the signal from the baseband to the intended frequency is done, in this example, by mixing in mixer 110 the signal provided by amplifiers 154 with the in-phase and quadrature components of a local carrier generated by circuit 190, and linked to a reference clock 129.

Once the signal is received on the other end of the radio link, it is processed by the receiving part of the transceiver of FIG. 1 comprises a low noise amplifier 160 followed to a down-conversion stage 170 that generates a baseband signal comprising a series of chirps, that is then processed by the baseband demodulator 180, whose function is the reverse of that of the modulator 150, and provides a reconstructed digital signal 182.

As discussed in EP2449690, the modulator 150 synthesizes a baseband signal that comprises a series of chirps whose frequency changes, along a predetermined time interval, from an initial instantaneous value $f_0$ to a final instantaneous frequency $f_1$. It will be assumed, to simplify the description, that all the chirps have the same duration T, although this is not an absolute requirement for the invention.

The chirps in the baseband signal can be described by the time profile $f(t)$ of their instantaneous frequency or also by the function $\phi(t)$ defining the phase of the signal as a function of the time. Importantly, the modulator 150 can generate chirps having a plurality of different profiles, each corresponding to a symbol in a predetermined modulation alphabet.

Figure 2A:
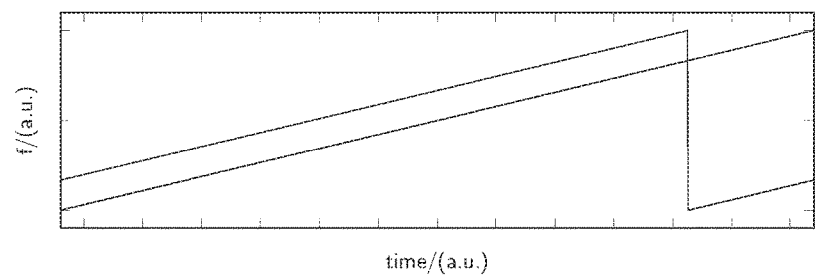
FIG. 2a plots the instantaneous frequency of a base chirp and of a modulated chirp according to one aspect of the invention. The phase of the same signals is represented in FIG. 2b, and FIG. 2c plots the real and of the complex component of the base chirp, in the time domain.
Figure 2B:
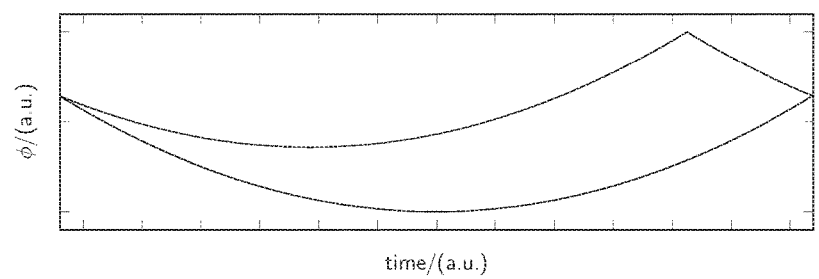

According to an important feature of the invention, the modulator 150 can generate either base chirp (also called unmodulated chirps in the following) that have specific and predefined frequency profile, or one out of a set of possible modulated chirps, obtained from base chirps by time-shifting cyclically the base frequency profile. FIG. 2a illustrates, by way of example, possible frequency and phase profiles of a base chirp and of one modulated chirps between the time instant $t=t_0$ at the beginning of a chirp and the instant $t=t_1$ at the end of the chirp, while FIG. 2b shows the corresponding baseband signals in the domain of time. The horizontal scale corresponds for example to a symbol and while the plots are represented as continuous, they will be represented by a finite number of discrete samples, in a concrete implementation. As to the vertical scales, they are normalized to the intended bandwidth or to the corresponding phase span. The phase, in particular, is represented in FIG. 2b as if it were an unbounded variable, in order to show better its continuity, but it may in fact span across several revolutions in a concrete implementation.

In the example depicted, the frequency of a base chirps increases linearly from an initial value $f_0=-BW/2$ at, to a final value $f_1=BW/2$, where BW stands for the amount of bandwidth spreading, but descending chirps or other chip profiles are also possible. Thus, the information is encoded in the form of chirps that have one out of a plurality of possible cyclic shifts with respect to a predetermined base chirp, each cyclic shift corresponding to a possible modulation symbol.

Figure 2C:
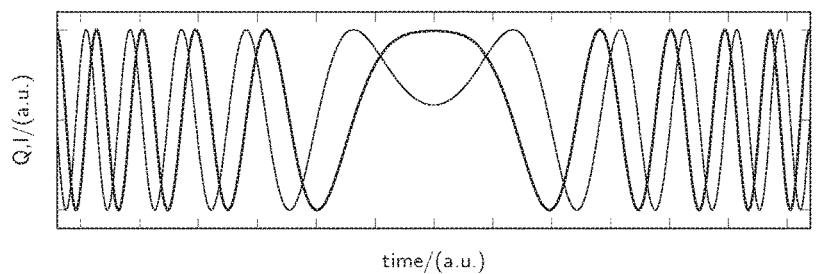

FIG. 2c is a plot of the real and imaginary component, I and Q, of the baseband signal corresponding to a base chirp, in the time domain.

Preferably, the modulator is also arranged to synthesize and insert in the signal conjugate chirps, that is chirps that are complex-conjugate of the base unmodulated chirp. One can regard these as down-chirps, in which the frequency falls from a value of $f_0=BW/2$ to $f_1=-BW/2$.

Preferably, the phase of the chirps is described by a continuous function $\phi(t)$, that has the same value at the beginning and at the end of a chirp: $\phi(t_0)=\phi(t_1)$. Thanks to this, the phase of the signal is continuous across symbol boundaries, a feature that will be referred to in the following as inter-symbol phase continuity. In the example shown in FIG. 2a, the function $f(t)$ is symmetrical, and the signal has inter-symbol phase continuity. As is explained in more detail by EP2449690, the structure of the signal described above allows the demodulator unit 180 in the receiver to align its time references with that of the transmitter, and the determination of the amount of cyclical shift imparted to each chirp. The operation of evaluating a time shift of a received chirp with respect to a local time reference may be referred to in the following as "dechirping", and can be carried out advantageously by multiplying the received chirp by a complex conjugate of a locally-generated base chirp, and performing a FFT. The position of the maximum of the FFT is indicative of the shift, and of the modulation value. Other manners of dechirping are however possible.

Thus, "cyclic shift value" may be used in the following to indicate the modulation in the time domain, and "modulation position", or "peak position" represents it in the frequency domain.

We note N the length of the symbol, or equivalently the spreading factor. To allow easy reception using FFT, N is preferably chosen to be a power of two. The Nyquist sampling frequency if 1/BW, and the length of a symbol is N/BW. To fix the ideas, but without limiting the invention to these specific numeric values, one can imagine that, in a possible application, BW be 1 MHz, and N equal 1024, 512, or 256. The carrier frequency may be in the 2.45 GHz ISM band. In this particular embodiment, the modulation schema of the invention could occupy the same RF band as a Bluetooth® transceiver and, possibly, reuse or share the RF parts of a Bluetooth® transceiver.

Hence, a modulated symbol is a cyclic shift of the base symbol, of any number between 0 and N−1. A modulation value of 0 is equivalent to the absence of modulation. Since N is a power of two, the value of the cyclic shift can be coded over $\log_2 N$ bits.

Preferably, the signal transmitted and received by the invention are organised in frames that include a preamble and a data section, suitably encoded. The preamble and the data section comprise a series of chirps modulated and/or unmodulated, that allow the receiver to time-align its time reference with that of the transmitter, retrieve a information, perform an action, or execute a command. In the frame of the invention, several structures are possible for the data frame, depending inter others, on the channel condition, transmitted data or command. Preferably, the frames include a preamble, whose purpose is to allow the synchronisation in time and frequency between transmitter and receiver, and a payload that expresses the transmitted data or command.

According to an aspect of the invention, transmitters and receiver nodes have preferably a communication mode that allow exchange of data by modulated chirp signals, and/or a ranging mode in which ranging exchange of signals takes place between a master device and a slave device that leads to the evaluation of the range between them. The slave is arranged for recognizing a ranging request and transmit back a ranging response containing chirps that precisely aligned in time and frequency with the chirps in the ranging requests, whereupon the master can receive the ranging response, analyze the time and frequency the chirps contained therein with respect to his own time reference, and estimate a range to the slave.

Figure 3:
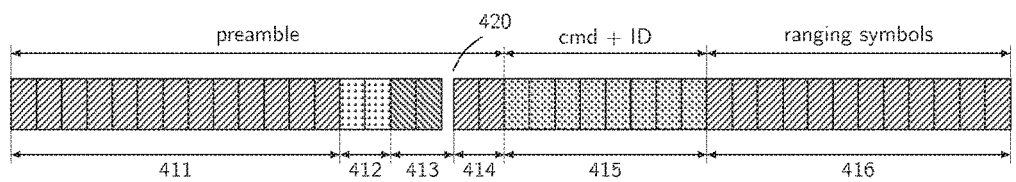
FIG. 3 represents schematically the structure of a data frame exchanged between two devices during the ranging method of the present invention.

FIG. 3 represents schematically a possible structure of a frame comprising a ranging request. The ranging requests starts with a preamble that may have a structure in common with other frames exchanged in the system of the invention for other purposes, and includes a detect sequence 411 of base (i.e. un-modulated, or with cyclic shift equal to zero) symbols. The detect sequence 411 is used in the receiver to detect the beginning of the signal and, preferably, perform a first synchronisation of its time reference with the time reference in the transmitter. By dechirping the demodulated detect sequence, for example multiplying it by a locally-synthesized conjugate chirp, and performing a FFT operation, the receiver is able to determine a shift amount.

The length of the detect sequence can be arbitrarily long. This is used in application in which communications are sparse and separated by long intervals of inactivity during which the receivers are in low-power standby modes. The receiver exhibits in general an idle time, upon reception of a first signal, for commuting from the standby state into a fully awake state. The preamble is preferably chosen longer than the idle time of receivers, which ensures a high probability of preamble detection.

The end of the detect sequence is marked by one or more, preferably two, frame synchronisation symbols 412 that are chirps modulated with predetermined values, for example a first chirp with a modulation value of 4, and a second one with the opposite modulation N−4. These modulated symbols are used to get a frame synchronization. In the example shown, the receiver looks for the presence of 3 consecutive symbols: unmodulated, modulated with first value, modulated with second value. Since the reception errors are mostly ±1 offsets, it would not be advisable choosing these values for the frame synchronisation symbols 412. Preferably the modulation of the frame synchronisation symbols is larger, in absolute shift, than 3 units, so as to minimize the likelihood of errors.

The use of a single modulated symbol as frame synch marker is possible, but not optimal for low signal to noise ratios, where it could lead to false frame synch events, as soon as a demodulation error occurs from 0 to—say—4. The use of the same modulation value for several symbols also possible, albeit less robust, because a single demodulation error can offset the frame synch by one symbol.

The predetermined modulation values of the frame synchronisation symbols 412 can be used also as network signature, allowing the coexistence of several networks without receiving each other's packets. When the receiver tries to achieve frame synch using different pre-determined values than the frame it is receiving, frame synch will fail as the expected sequence will not occur. When used for this purpose, the frame synchronization symbols modulation values should be unique to a network. For 2 symbols the sets can be, for instance, {3, N−3} for the first network, then {6, N−6}, then {9, N−9}, etc. Again, separation of 3 values is important because the most likely demodulation errors are ±1 offsets in modulation value.

According to another aspect of the invention, the preamble includes preferably frequency synchronisation symbols 413 that consist in one or more, preferably two chirps that are complex-conjugate of the base unmodulated chirp. One can regard these in the baseband representation as down-chirps, in which the frequency falls from a value of $f_0$=+BW/2 to $f_1$=—BW/2. Once frame synch is achieved, the receiver can demodulate these, using a modified processing sequence: the baseband signal is multiplied by the complex conjugate of the sequence used to demodulate all other symbols in preamble and data, and then FFT-transformed.

While conjugate symbols for frequency synchronisation are effective, this is not the only possibility, and the invention is not necessarily so limited. The conjugate symbols may be replaced in fact by chirps that have a different bandwidth or duration than the base chirps, thus exhibiting a frequency variation that is faster, or slower than that of the base chirps. This variant would require a more complex receiver, but, on the other hand, leaves the conjugate-chirps free to use for data transmission.

The apparent value of modulation will give the frequency error, thanks to the time-frequency equivalence property of chirps. To let the receiver align in time, a silence 420 is inserted after the symbols 413.

Two symbols are better than one, because some repetition is necessary not to make a demodulation error. Also, since the two symbols are modulated with the same starting phase, a fine frequency error can be extracted.

Optionally, the header further includes fine synchronisation symbols 414 that are unmodulated base chirps, for example, and give the opportunity of a fine time and frequency synchronization and allows the implementation of fully coherent receivers simply, as well as more compact headers in the data symbols and, equivalently, higher bit rates. It is possible to process these symbols as outlined above, multiplying them by a conjugate symbol, extracting an FFT, and determining a peak position that corresponds to a fine time shift. Such fine time shift is not subject to drift, because once coarse synchronisation has been achieved, systematic sampling drifts due to offsets in crystal references are properly accounted for. The comparison of relative phases of this peak in different symbols allows to synchronise finely the frequencies between transmitter and receiver.

If the frequency synchronisation relies on the frequency synchronization symbols 413 only, some frequency offsets can result in an error of one modulation position: these are frequency offsets such that the demodulation of down-chirps give two identically likely values (these are adjacent values). A simple receiver is not able to discriminate the two values, and can take the wrong decision, yielding a small residual frequency offset, and half of a modulation position timing error. Such an error can give a full position modulation error, depending on noise. An alternative way to give better robustness to the receiver right after frequency synchronization is the reduced set of modulation values, at the expense of lower data rate.

In addition to performing fine time alignment, these symbols can give another fine frequency error estimate. This allows the implementation of simple coherent receivers, which in turn makes possible the modulation of the phase of symbols, in addition to cyclic shifts as modulation method.

The header part of the frame is a data field 415 that includes an indication that the frame is intended for ranging, and an identification code of the specific device whose ranging is needed. Only this specific device having an identification code equal to that specified in the header should respond to the ranging request.

The ranging symbols 416 are a succession of unmodulated chirps having a predetermined time structure. Preferably they are a succession of unmodulated chirps, i.e. base chirps.

Figure 6:
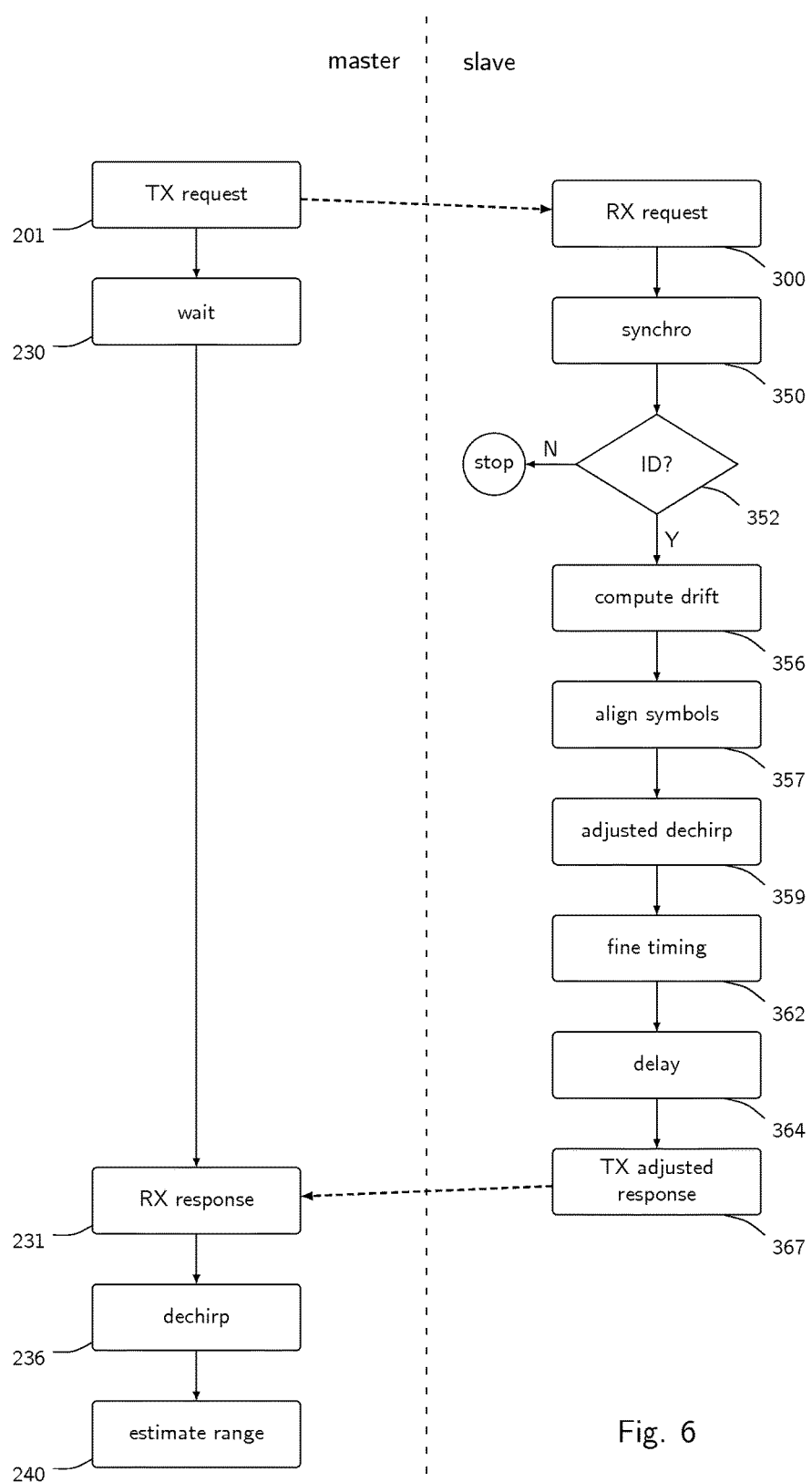
FIG. 6 shows schematically the steps used in a possible embodiment of the invention.

FIG. 6 illustrates schematically a possible sequence of steps in master and slave devices during a ranging exchange. The exchange is initiated by the master that transmits a ranging request (step 201) designating a particular slave device, and then waits (step 230) for the appropriate response. The slave receives the request (step 300) and deals with it as with a normal transmission at first. It runs usual steps of detection, time and frequency synchronization (step 350), and header decoding. Then it finds out that frame is a ranging request, and compares (step 352) the ranging request ID to its own ID. If they match, it will proceed to next steps. During this first phase, the slave has estimated a frequency offset between master and itself. This frequency offset is used to compute (step 356) a timing drift between them, assuming timing and frequency derive from a same time reference. The slave then carries out the ranging specific steps:

a—Ranging synchronization (step 357): this is to align in time to the ranging symbols transmitted by the master. Indeed, there can be a time offset right after the header, as the header is robust to small time offsets.

b—Ranging computation (step 359). For each symbol, an adjusted dechirp operation is performed. A different local chirp is synthesized for dechirping each symbol in order to adjust for the timing drift: first the slope of the chirp is modified, by a very small fraction corresponding to the crystal offset. Second the starting frequency of the chirp is modified, to accommodate the accumulated timing error since the ranging synchronization instant, this value is equal to the symbol index times an evaluated timing drift per symbol. We here use fully the frequency-time equivalence of chirps, and the fact that these compensations are very small. In alternative, the receiver could interpolate over time, but this would be much more complex than a frequency shift. The compensations are small, frequency shifts of some PPMs won't make the signal step away from the channel. Frequency-time equivalence of chirps means that a time offset is equivalent, in certain aspects, to a frequency offset.

After FFT, the relative value of output at expected position (bin 0, no modulation) is compared to its neighbours. Then an interpolation is performed to find a fine timing (step 362). This amounts to evaluating the frequency of a sinusoid from a discrete observation of FFT values not exactly placed on the desired frequency, and can be carried out in various ways.

Several symbols are averaged together to get the fine timing estimate. This allows the slave to determine the exact timing instant at which the response is to be transmitted by adding together the Coarse Timing shift and the Fine Timing shift determined form the header (step 350), the duration of the ranging sequence given by the expression Ranging_symbols_numbers×(symbol_duration+timing_drift_per_symbol) and a predetermined ranging response offset. The slave thus waits until the timing instant (step 364) and transmits a ranging response (step 367).

The ranging response offset is a predetermined time interval that accommodates processing time, and uses the delay inside receive and transmit radios of the slave. Assuming the estimates are correct, the ranging response starting time of the signal at the antenna should equal the starting time of the received request, plus a fixed offset, preferably corresponding to an integer number of symbols. The ranging response offset can be constant or adaptively adjusted in order to compensate for temperature changes or other drift sources.

Importantly, by determining the coarse and fine time shift estimates and the timing drift, the slave device of the invention is capable to determine the time and frequency shifts of its own time reference with respect to that of the master, based on the time and frequency of chirps contained in the ranging request, thanks to the special property of the ranging request that includes chirp-modulated signals as explained above.

The ranging response is made of several unmodulated chirps. Preferably the same compensation is used than during the adjusted dechirp step 359 in ranging computation: a slope compensation, plus a timing drift accumulation compensation. This comes in addition to a compensation of transmitted frequency, according to estimated frequency. In this way, the ranging response is precisely aligned in time and frequency with the time reference of the master.

Here it is important to notice that the system is robust to small errors in frequency offset estimation. If a small error occurs, the receiving frequency and transmitted frequency will be slightly wrong, however the timing drift estimation will be almost correct. This is because timing drift estimation is the division of estimated frequency by carrier frequency. At 868 MHz for instance, an error of 120 Hz, which is an unlikely error of a full FFT bin using a spreading factor of 4096 and a bandwidth of 500 KHz, results in an error of only 0.13 ppm: this would give only a 1.5 meters ranging error. Second, as the response is time aligned to the request, if there is an error in estimated frequency, it will be compensated by a proportional error in time synchronization, such that the frequency=f(time) functions of received signal and demodulating signal are aligned. The impact of mis-synchronization is then only a tiny degradation of received energy.

Figure 4A:
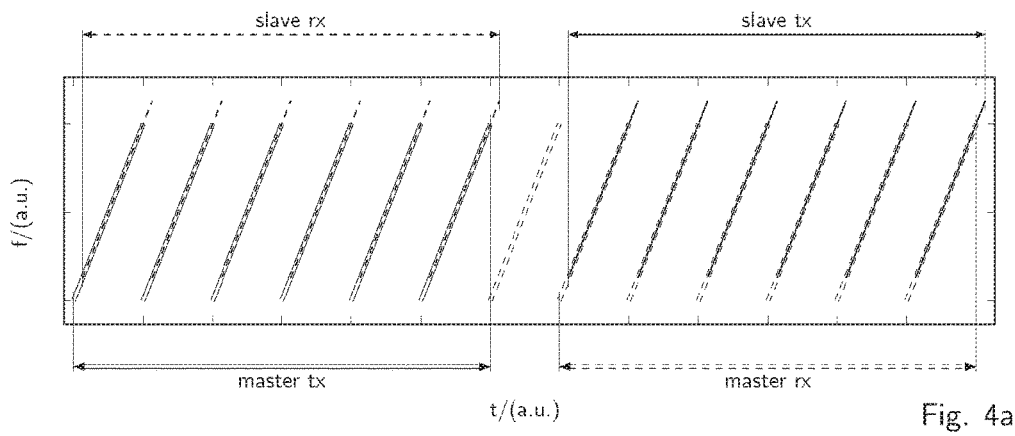
FIGS. 4a and 4b illustrate the time-alignment of chirps between a master and a slave device involved in the ranging process of the invention, showing two possible timing errors, and the misalignments that are involved.
Figure 4B:
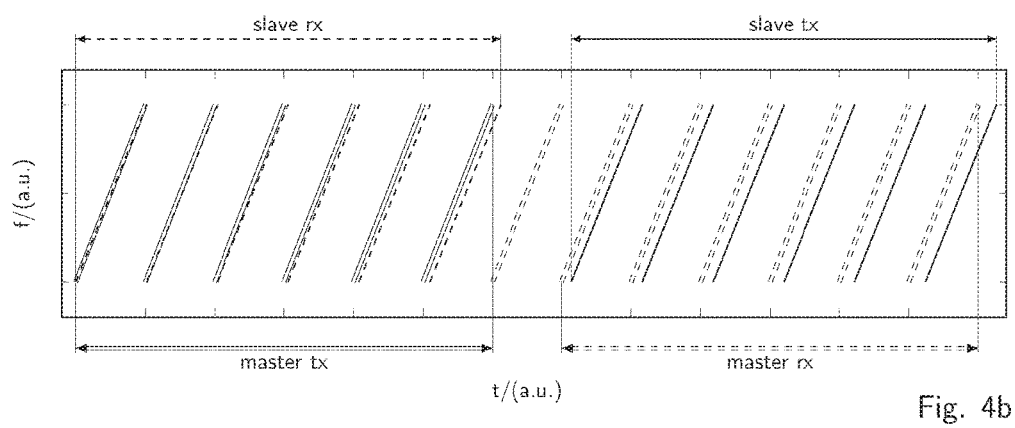

These two effects are illustrated In FIGS. 4a and 4b, that plot the instantaneous frequencies of a series of chirps in the master and in the slave. Chirps generated in the master device are represented by double lines, while those pertaining to the slave device are drawn by single lines. Solid lines indicate signal transmitted between master and slave, while dashed line stand for locally signals used for dechirping, for example:

FIG. 4a shows that the scheme is robust to small frequency estimation errors from the slave, FIG. 4b shows that timing compensation is mandatory.

Returning now to FIG. 6, on the master side, the reception of ranging response (step 231) requires no synchronization steps. The master assumes that frequency and timing are perfectly aligned. The ranging response does not need to embed frequency estimation symbols. The master only estimates a timing, performing exactly the same steps (236 and 240) than the slave in ranging computation without compensation. This simplifies the modem, as the ranging core is common to both master and slave.

Preferably the invention comprises a diversity combining to improve the reliability and precision of range estimates. By diversity it is here intended that several ranging measures are performed between the same devices. These measures can be made successively with separated exchanges, in parallel during the same exchange, or both.

Preferably the combination of diversity is based on received signal strength indication. Measures that correspond to RSSIs which are lower than a given threshold are discarded. Then, remaining measures are averaged to get an initial range estimate. A weighted average of estimates, using RSSI in linear scale as weight, is also possible.

In a possible implementation, the threshold applied is around 6 dB: ranging measures which have an associated RSSI 6 dB lower the maximum RSSI of the measures set are discarded. This threshold comes from experimental data.

If both spatial (i.e antenna diversity) and frequency diversity are used, the threshold is preferably computed for each antenna.

Once the average of selected measures is available, the range estimate is compensated for multipath. The average effect of multipath is to increase the measured time of flight compared to the single path, line of sight case. Since range is better represented by a measure of the direct path, this compensation is important. Since the system of the invention is in general incapable to resolve the temporal structure of the channel (i.e. resolving individual echos) because of its narrow band, proper compensation can improve considerably the reliability the range estimates.

The longer the distance between the devices, the greater the delay spread of the propagation channel. The impact of delay spread is however capped: echoes which occur after a delay longer than the time resolution of the system don't modify the range estimates.

At a very short distance, below a few meters, the power profile of the channel is decaying fast. We observed that the shorter the distance, the lower the impact of multipath. Actually for the limit case, which is null distance between devices, the direct path dominates a lot the echoes, so that their impact is very small.

Figure 5:
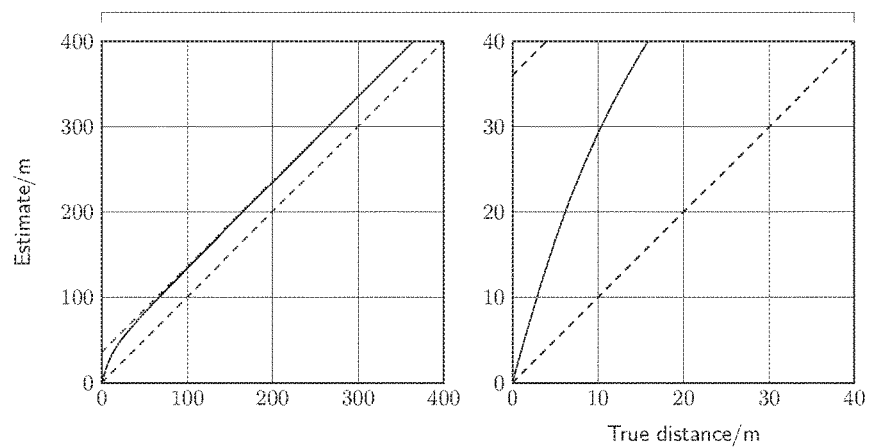
FIG. 5 plots a correction function used to estimate a range according to one aspect of the invention.

This behaviour has been determined from experimental data; FIG. 5 illustrates a possible compensation curve used to extract a true range from a range estimate affected by multipath. Measures using RF cables of various lengths confirmed that radio propagation in the air was the source of this distance dependent ranging bias.

The invention preferably includes automatic adaptations measures, for example rate adaptation, adaptive hopping for diversity, and the ability to perform auto-calibration of a pair of devices in a "find my stuff" application.

Adaptive rate is used to maximize the capacity of a network, or the capacity of a link. The system of the invention is preferably capable to adapt the frequency and/or the bandwidth and/or the spreading factor of the signal based on the channel state.

By doing rate adaptation, the measure rate can be increased if the signal to noise ratio is good enough. Rate adaptation is done with the same mechanisms than the transmission system: the spreading factor is changed, the value of the spreading factor is exchanged using the communication path. Shorter measures can provide higher accuracy thanks to more averaging, track more items, or save power.

Adaptive hopping is a feature which is very useful in particular in the 2.4 GHz ISM band, because it is crowded with many other applications. Since the system of the invention is narrowband, it can offer ranging service even when most of the band is used. This cannot be done by wider band systems which are less agile. The best frequency can be determined by a variety of known methods, and sufficient information on the hopping sequence is transmitted using the communication path.

The system of the invention is preferably arranged to auto-calibrate ranging measures, using distance dependent ranging error. As shown in FIG. 5, the slope of estimated range versus distance increases as distance reduces, up to a slope of 5 for very close ranges, for example less than 15 meters. In a typical point to point application, the user is going to aim at a searched person or thing, at walking speed, thus it can be assumed that the rate of change of the true range is more or less constant and limited to, for example 1.5 m/s. Once there is a sudden change in the uncompensated range estimate (before bias compensation described in 2), and if the corresponding speed is too high to be pedestrian speed, the system can deduce that the true range to the searched object is less than 15 meters. This can be used to modify the calibration of the master device, to compensate for a calibration error of the master, or more likely of the slave (searched device). The modified calibration of the master actually improves the calibration of the pair. Conversely, If the range estimate is lower than 15 meters, but if at the same time the uncompensated distance estimate varies at a pedestrian speed, then the system can detect an error and increase the estimated distance, since for short distances estimations should vary faster. This automatic calibration only happens when devices are close, which is exactly when it is needed. Having this automatic calibration in which the rate of change of the estimated range is used as an indication of the true range improves confidence in the system, where devices can be let without ranging activity for long periods of time.

Thanks to the long range the system offers, the invention can operate in highly obstructed conditions. In these situations, the ranging estimate will still be almost as accurate, since it is based on time of flight measures. Then, comparing the range estimate to the average received signal strength, the invention can build and display an obstruction indication. One way to compute this indication is to first compute a path loss exponent, which should be equal to 2 in line of sight. Path loss exponent is such that the receive power is inversely proportional to the distance raised to the power of the exponent. For this a knowledge of the transmitted power is needed, but this information does not need to be highly accurate, since the obstructions effect is usually dominant. A possible indication of the obstruction is obtained by subtract 2 from the path loss exponent, and reporting this number to the user.

For an application where the user has a hand-held device, the obstruction indication can be a bar growing in size and/or changing colour as obstruction increases. This way, the hand held device can report simultaneously an estimated range, and an estimated obstruction. The obstruction level can be used as a direction hint: outdoors, when obstruction is high it often indicates that the body of the user is obstructing the signal, and facing a different direction can confirm this. Indoors, high obstruction level indicates that the item the user is aiming at is not in the same room/floor. This is very convenient information for this application, as proven by several tests.

Figure 7:
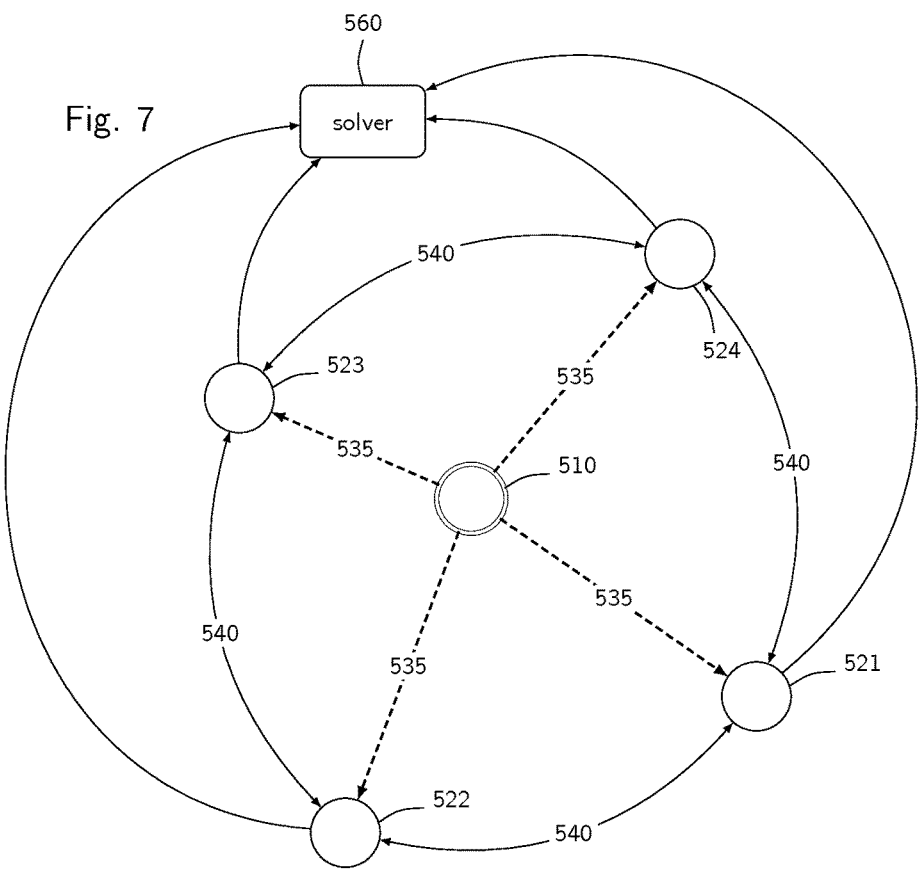
FIGS. 7 and 8 presents schematically positioning systems according to the present invention.

FIG. 7 represent a positioning system according to an aspect of the invention that allow the determination of the position of a mobile device 510. Device 510 is capable of communicating with a plurality of positioning devices 521-524 by radio signals comprising a series of chirps as explained above.

The positioning devices 521-524 act as beacons and are capable of communicate by suitable data links 540. Data links 540 can be wireless radio links, for example based also on chip-modulated radio signals, or on any suitable communication standard, or wired links based on electric cables, electric fibres, or any other appropriate data transmission means. Importantly, the data links 540 allow the synchronization of the respective time reference of the devices 521-524, as it is known in the art. The figure represents the positioning devices 521-524 interconnect among them, and mutually synchronising their clocks but, in a non represented variant, they could instead synchronise their time references to a common master reference.

Positioning devices 521-524 are preferably fixed, or at least slowly moving, and their locations, or at least their relative locations with respect to one another, are precisely known.

The position system also includes at least one solver device 560 that knows the locations of the positioning devices 521-524, and can exchange data with them, in order to compute the position of the mobile device 510, as it will be explained further on. Even if the solver device 560 is here represented as physically distinct from the positioning devices 521-524 for generality, this is not a limiting feature of the invention, and in fact each of the positioning devices 521-524, or all of them at the same time, could serve as solver, in which case the links 540 could be used both for clock synchronization and data exchange.

Preferably, the mobile device transmits a ranging request 535, for example formatted as in FIG. 3, to all the positioning devices. Each of the positioning devices receives the ranging request 535 and decodes it in the same manner, applying the steps 350-362 of FIG. 6, but each of them will determine a different ranging response offset since each has a different distance from the mobile device 510.

At this point the positioning method deviates from the previous embodiment in that, instead of generating a ranging response, the offsets are transmitted to the solver device 560, which computes the position of the mobile device 560 with respect to the positioning devices 521-524. To this end, it is required that a sufficient number of positioning devices determine an offset. In a general case, the solver will have to solve a system comprising four unknown: the coordinates x,y,z of the mobile device 510, and the offset Δt of its clock, hence at least four offsets form four independent positioning devices need to be determined. Methods of solving such systems are known in the art.

Figure 8:
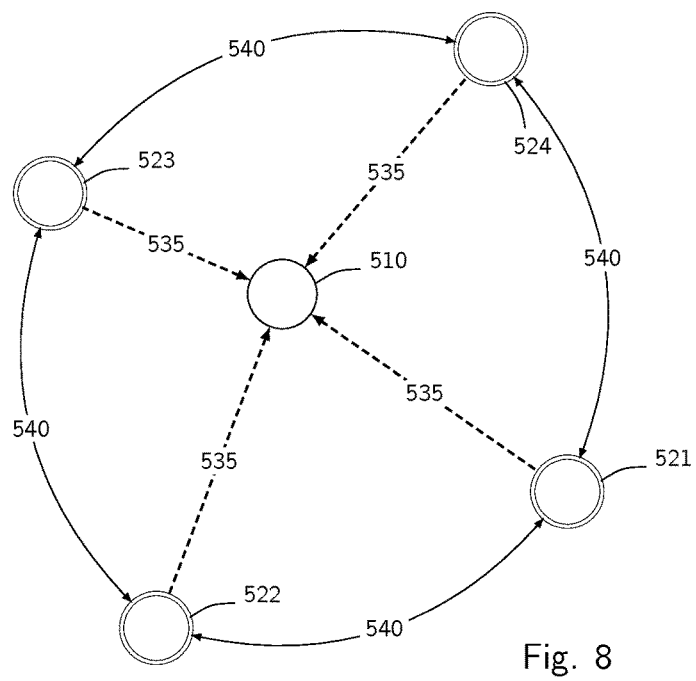

According to another embodiment, represented in FIG. 8, a position of a mobile node could be determined in the node itself. In this case a plurality of fixed positioning beacons 521-524 have their time reference synchronised by the links 540, as mentioned above, and emit simultaneously, or at predetermined time intervals, ranging sequences comprising chirps for example as in FIG. 3. The mobile device 510 can estimate, as explained with reference to the FIG. 6, the relative time offsets. Since the time references of the positioning nodes are synchronous, the mobile device 510 can, provided it determines at least the delays from four independent positioning devices and knows their positions, determine its own coordinates x,y,z and the offset Δt of its clock.

Importantly, in the last two embodiments, the position of the mobile node 510 is never transmitted and it is known only by the solver 560 or, in the latter, by the mobile device 510.

The invention claimed is:

1. A system comprising at least a transmitting device, and a receiving device, each device comprising a time reference and being arranged for transmitting and receiving radio signals that include a plurality of chirps, wherein each chirp is limited in time between an initial instant, at which the signal has an initial instantaneous frequency and a final instant at which the signal has a final instantaneous frequency, said initial and final instants and said initial and final frequencies being determined by the time reference, said devices having a ranging mode, in which a ranging request is transmitted from the transmitting device to the receiving device, and wherein the receiving device is arranged for receiving the ranging request and for determining the time and frequency shifts of the time reference of the receiving device with respect to the time reference of the transmitting, based on the time and frequency of chirps contained in the ranging request, wherein the ranging request comprises a series of identical chirps, and the receiving device is arranged for performing a dechirp operation, in which each received chirp is multiplied by a locally-generated conjugate chirp, and a FFT is executed on the result, whereupon the peak of the FFT is an indication of the time shift between the received chirps and the locally generated ones, and the receiving device is arranged for performing an adjusted dechirp, in which a different locally-generated chirp is used at each received chirp in order to adjust for the timing and frequency shifts of the time reference.

2. The system of the previous claim, the transmitting device acting as master, and the receiving device acting as slave, wherein the receiving device is arranged for transmitting back a ranging response containing chirps that are aligned in time and frequency with the time reference of the transmitting device, and the master device is arranged for receiving the ranging response, and for estimating a range to the slave device based on the time and frequency of chirps contained in the ranging response.

3. The system of claim 1, further comprising a plurality of receiving devices having a common time reference arranged for receiving the ranging request, and for determining a plurality of time offsets dependent on the range between the transmitting device and each receiving device, and a computing means, arranged for determining the position of the transmitting device based on said time offsets.

4. The system of claim 1, comprising a plurality of transmitting devices having a common time reference arranged for transmitting said ranging requests, and a receiving device, arranged for receiving the ranging requests and for determining a plurality of time offsets dependent on the range between the receiving device and each transmitting device, and for determining the position of the receiving device based on said time offsets.

5. The system of claim wherein each chirp is digitally synthesized and limited in time between an initial instant, at which the signal has an initial instantaneous frequency and an initial phase; and a final instant at which the signal has a final instantaneous frequency and a final phase, the phase of the signal being essentially continuous.

6. The system of claim 1, wherein the ranging response comprises a series of identical chirps that are synthesized in the receiving device applying different parameters to each chirp, such that they are aligned in time and frequency with the time reference of the transmitting device.

7. The system of claim 1, wherein the receiving and/or the transmitting devices are arranged to perform several ranging measures and for combining them based on the associated signal strength.

8. The system of claim 1, wherein the frequency and/or the bandwidth and/or a spreading factor of the radio signals is adapted based on a channel state.

9. The system of claim 1, wherein the receiving device is arranged to compensate a range estimate affected by multipath by applying a compensation curve.

10. The system of claim 9, arranged to execute automatic calibration of the compensation curve, in which the rate of change of the estimated range is used as an indication of the true range.

11. The system of claim 1, further arranged to compute an obstruction indication based on the range estimate and the received signal strength.

12. The system of claim 1, wherein the transmitting device and the receiving device have a communication mode that allows them to exchange digital data by chirp modulated radio signals.

13. A system comprising at least a transmitting device, and a receiving device, each device comprising a time reference and being arranged for transmitting and receiving radio signals that include a plurality of chirps, wherein each chirp is limited in time between an initial instant, at which the signal has an initial instantaneous frequency and a final instant at which the signal has a final instantaneous frequency, said initial and final instants and said initial and final frequencies being determined by the time reference, said devices having a ranging mode, in which a ranging request is transmitted from the transmitting device to the receiving device, and wherein the receiving device is arranged for receiving the ranging request and for determining the time and frequency shifts of the time reference of the receiving device with respect to the time reference of the transmitting, based on the time and frequency of chirps contained in the ranging request, wherein the ranging request comprises a series of identical chirps, and the receiving device is arranged for performing a dechirp operation, in which each received chirp is multiplied by a locally-generated conjugate chirp, and a FFT is executed on the result, whereupon the peak of the FFT is an indication of the time shift between the received chirps and the locally generated ones, and the receiving device is arranged for performing an adjusted dechirp, in which a different locally-generated chirp is synthesized for dechirping each received chirp with a slope and a starting frequency dependent from the timing and frequency shifts of the time reference in order to adjust for the timing and frequency shifts of the time reference.

* * * * *